(12) United States Patent
Nordin et al.

(10) Patent No.: US 10,214,624 B2
(45) Date of Patent: Feb. 26, 2019

(54) APPARATUS AND METHOD FOR EXPANDING THERMALLY EXPANDABLE THERMOPLASTIC MICROSPHERES TO EXPANDED THERMOPLASTIC MICROSPHERES

(71) Applicants: Akzo Nobel Chemicals International B.V., Arnhem (NL); Construction Research & Technology GmbH, Trostberg (DE)

(72) Inventors: Jan Nordin, Kvissleby (SE); Lars-Olof Svedberg, Kvissleby (SE); Per Ajdén, Bergeforsen (SE); Frank Shaode Ong, Solon, OH (US)

(73) Assignees: AKZO NOBEL CHEMICALS INTERNATIONAL B.V., Arnhem (NL); CONSTRUCTION RESEARCH & TECHNOLOGY GMBH, Trostberg (DE)

( * ) Notice: Subject to any disclaimer, the term of this patent is extended or adjusted under 35 U.S.C. 154(b) by 0 days.

(21) Appl. No.: 15/534,665

(22) PCT Filed: Dec. 8, 2015

(86) PCT No.: PCT/EP2015/078914
§ 371 (c)(1),
(2) Date: Jun. 9, 2017

(87) PCT Pub. No.: WO2016/091847
PCT Pub. Date: Jun. 16, 2016

(65) Prior Publication Data
US 2018/0265662 A1    Sep. 20, 2018

Related U.S. Application Data

(60) Provisional application No. 62/090,650, filed on Dec. 11, 2014.

(30) Foreign Application Priority Data

Jan. 23, 2015  (EP) .................................... 15152251

(51) Int. Cl.
*C08J 9/22* (2006.01)
*C04B 20/06* (2006.01)
(Continued)

(52) U.S. Cl.
CPC ................. *C08J 9/22* (2013.01); *C04B 20/06* (2013.01); *B29C 35/0805* (2013.01);
(Continued)

(58) Field of Classification Search
CPC ............ C04B 20/06; B29C 2035/0855; B29C 35/0805; B29C 44/3415; B29K 2105/048
See application file for complete search history.

(56) References Cited

U.S. PATENT DOCUMENTS

| | | |
|---|---|---|
| 3,615,972 A | 10/1971 | Morehouse, Jr. et al. |
| 3,945,956 A | 3/1976 | Garner |

(Continued)

FOREIGN PATENT DOCUMENTS

| | | |
|---|---|---|
| EP | 0 147 173 A2 | 7/1985 |
| EP | 0486080 A2 | 5/1992 |

(Continued)

OTHER PUBLICATIONS

International Search Report and Written Opinion for PCT/EP2015/078914 dated Mar. 29, 2016.
(Continued)

*Primary Examiner* — Irina S Zemel
(74) *Attorney, Agent, or Firm* — Matthew J. DeRuyter

(57) ABSTRACT

An apparatus and a method for expanding a slurry of thermally expandable thermoplastic microsphere is disclosed. The apparatus and method expand the slurry of
(Continued)

thermally expandable thermoplastic microsphere without any direct contact to a fluid heat transfer medium. The apparatus and method utilize a distribution pipe attached to an outlet pipe.

17 Claims, 2 Drawing Sheets

(51) Int. Cl.
  *B29K 105/04*   (2006.01)
  *B29C 35/08*   (2006.01)
  *B29C 44/34*   (2006.01)

(52) U.S. Cl.
  CPC .. *B29C 44/3415* (2013.01); *B29C 2035/0855* (2013.01); *B29K 2105/048* (2013.01); *C08J 2201/034* (2013.01); *C08J 2300/22* (2013.01)

(56) References Cited

U.S. PATENT DOCUMENTS

| | | |
|---|---|---|
| 4,287,308 A | 9/1981 | Nakayama et al. |
| 4,513,106 A | 4/1985 | Edgren et al. |
| 5,480,599 A * | 1/1996 | Leven ............ B29C 44/3461 264/51 |
| 5,536,756 A | 7/1996 | Kida et al. |
| 6,235,394 B1 | 5/2001 | Shimazawa et al. |
| 6,235,800 B1 | 5/2001 | Kyuno et al. |
| 6,509,384 B2 | 1/2003 | Kron et al. |
| 6,617,363 B2 | 9/2003 | Ohmura et al. |
| 6,984,347 B2 | 1/2006 | Masuda et al. |
| 2004/0176486 A1 | 9/2004 | Glorioso et al. |

FOREIGN PATENT DOCUMENTS

| | | |
|---|---|---|
| EP | 0566367 A2 | 10/1993 |
| EP | 1067151 A1 | 1/2001 |
| EP | 1230975 A1 | 8/2002 |
| EP | 1288272 A1 | 3/2003 |
| EP | 1598405 A1 | 11/2005 |
| EP | 1811007 A1 | 7/2007 |
| EP | 1964903 A1 | 9/2008 |
| JP | H01-128245 A | 5/1989 |
| JP | 2005-254213 A | 9/2005 |
| JP | 2007-088630 A | 4/2007 |
| WO | 02/096635 A1 | 12/2002 |
| WO | 03/051793 A2 | 6/2003 |
| WO | 2004/072160 A1 | 8/2004 |
| WO | 2007/091960 A1 | 8/2007 |
| WO | 2007/091961 A1 | 8/2007 |
| WO | 2007/142593 A1 | 12/2007 |
| WO | 2014/198532 A1 | 12/2014 |

OTHER PUBLICATIONS

European Search Report issued in EP Application No. 15152251.3-1351 dated Aug. 15, 2017.

* cited by examiner

APPARATUS AND METHOD FOR EXPANDING THERMALLY EXPANDABLE THERMOPLASTIC MICROSPHERES TO EXPANDED THERMOPLASTIC MICROSPHERES

This application is a national stage filing under 35 U.S.C. § 371 of PCT/EP2015/078914, filed Dec. 8, 2015, which claims priority to U.S. Provisional Patent Application No. 62/090,650, filed Dec. 11, 2014, and European Patent Application No. 15152251.3 filed Jan. 23, 2015, the contents of which are each incorporated herein by reference in their entireties.

FIELD OF INVENTION

The present invention relates to an apparatus and method for expanding thermally expandable thermoplastic microspheres to achieve expanded thermoplastic microspheres. In particular the apparatus and method ensure the expanded thermoplastic microspheres are free of agglomerates, with a uniform density distribution and are rapidly cooled after expansion.

BACKGROUND OF INVENTION

Thermally expandable thermoplastic microspheres comprise a blowing agent encapsulated within a thermoplastic polymer shell. Thermally expandable thermoplastic microspheres are disclosed in, for example U.S. Pat. No. 3,615,972.

Upon heating, the blowing agent evaporates leading to an increase in an internal pressure of the thermally expandable thermoplastic microspheres, at the same time the thermoplastic polymer shell softens resulting in an expansion of the thermally expandable thermoplastic microspheres to form the expanded thermoplastic microspheres. The expanded thermoplastic microspheres have a diameter often at least 2-5 times that of the thermally expandable thermoplastic microspheres.

The thermally expandable thermoplastic microspheres are available as dry free-flowing thermally expandable thermoplastic microspheres or as a slurry of thermally expandable thermoplastic microspheres i.e. where the thermally expandable thermoplastic microspheres are present in a carrier liquid.

The thermally expandable thermoplastic microspheres or the expanded thermoplastic microspheres are utilised in various applications. The thermally expandable thermoplastic microspheres are used, for example, in thermal printing papers, porous ceramics, injection moulding, extrusion of thermoplastic materials, printing inks, paper and board. The expanded thermoplastic microspheres are used for example as a sensitizer in emulsion explosives, liquid based paints, liquid based coatings and various thermosetting materials such as cultured marble, polyester putty and artificial wood. The expanding thermally expandable thermoplastic microspheres and/or the expanded thermoplastic microspheres may also be used in cementitious compositions, for example to impart freeze-thaw durability to cementitious compositions.

Transporting the expanded thermoplastic microspheres may not be commercially viable since the expanded thermoplastic microspheres require significant volume due to their expanded size. Therefore thermally expandable thermoplastic microspheres are transported to the end-user who produces the expanded thermoplastic microspheres on-site from the slurry of thermally expandable thermoplastic microspheres. The thermally expandable thermoplastic microspheres are then expanded to form the expanded thermoplastic microspheres close to or directly into a process for the final application, e.g. any of those mentioned above.

Apparatuses and methods are known in the art for expanding thermally expandable thermoplastic microspheres to form the expanded thermoplastic microspheres.

JP 2005-254213 discloses an apparatus and a method for manufacturing a heat-expanded microcapsule. The apparatus and method use a heating/foaming tube. JP 2005-254213 discloses that a water slurry of heat-expansible microcapsules is force-fed into the heating/foaming tube with high-temperature steam by applying a back pressure exceeding the pressure of the steam. The heat-expansible microcapsules are discharged into air and then expanded.

U.S. Pat. No. 4,513,106 discloses an apparatus and a method to form expanded thermoplastic microspheres from thermally expandable thermoplastic microspheres. U.S. Pat. No. 4,513,106 discloses that steam is introduced into a slurry of thermally expandable thermoplastic microspheres in a pressure zone in an amount sufficient to heat the thermally expandable thermoplastic microspheres and at least partially expand them. The partially expanded thermoplastic microspheres then leave the pressure zone under a pressure drop whereby the microspheres are further expanded and accelerated into a stream with a velocity of at least 1 m/s.

WO 03/051793 discloses a method of manufacturing an explosive by providing thermally expandable microspheres with steam to cause thermal expansion of the microspheres to form wet expanded microspheres.

The apparatuses and methods of JP 2005-254213, U.S. Pat. No. 4,513,106 and WO 03/051793 have drawbacks in that the resulting expanded thermoplastic microspheres stick together and form agglomerates in the apparatus and the final product. Furthermore, the steam or moisture added to the expanded thermoplastic microspheres, as disclosed therein, often leads to incompatibility of moisture in the expanded thermoplastic microspheres and their use in end applications.

Expanded thermoplastic microspheres are good insulators of heat and when manufactured this poses a problem when they are manufactured and stored. The expanded thermoplastic microspheres often continue to expand in storage. Furthermore since the expanded thermoplastic microspheres have a thermoplastic polymer shell, when this shell is hot this causes the expanded thermoplastic microspheres to stick together and form agglomerates during manufacture and/or storage. Agglomerated expanded thermoplastic microspheres are undesirable in applications where uniformly disperse expanded thermoplastic microspheres are required.

It would be desirable to improve the technology of expanding thermally expandable thermoplastic microspheres in a slurry such that agglomeration of manufactured expanded thermoplastic microspheres is avoided providing highly disperse and uniformly expanded thermoplastic microspheres.

It would be desirable to provide an apparatus and a method for expanding thermally expandable thermoplastic microspheres in a slurry without the need to introduce extra water i.e. steam.

It would be desirable to provide an apparatus and a method for expanding thermally expandable thermoplastic microspheres in a slurry that is flexible in respect of which carrier liquid is used in the slurry of thermally expandable thermoplastic microspheres.

It would be desirable to provide an apparatus and a method for expanding microspheres in a slurry that is flexible in respect to a means for heating the slurry of thermally expandable thermoplastic microspheres to form the expanded thermoplastic microspheres.

It would be desirable to provide an apparatus and a method for expanding thermally expandable thermoplastic microspheres in a slurry which avoids agglomeration of the formed expanded thermoplastic microspheres in the apparatus.

It would be desirable to provide an apparatus and a method for expanding thermally expandable thermoplastic microspheres in a slurry that can be used for a broad range of microsphere grades having various expansion temperatures.

It would be desirable to provide an apparatus and a method for expanding thermally expandable thermoplastic microspheres in a slurry which do not continue to expand once they have left an expansion apparatus.

There is a need to provide an apparatus and a method for the expanding thermally expandable thermoplastic microspheres in a slurry which overcomes at least the aforementioned drawbacks.

SUMMARY OF INVENTION

According to the present invention, it has been found possible to achieve these and other objects by providing an apparatus and a method as described herein.

In a first aspect the present invention relates to an apparatus for expanding thermally expandable thermoplastic microspheres. The apparatus comprises a heating zone which is capable of withstanding a pressure of at least 4 bars. The heating zone has an inlet pipe and an outlet pipe. The apparatus comprises a pump for feeding a slurry of thermally expandable thermoplastic microspheres into the heating zone. The pump is capable of generating a pressure of at least 4 bars in the heating zone. The apparatus comprises a means for heating the slurry of thermally expandable thermoplastic microspheres in the heating zone to a temperature of at least 60° C. without any direct contact of the slurry to any fluid heat transfer medium. The outlet pipe of the apparatus is attached to a distribution pipe between an inlet and an outlet of the distribution pipe.

In a further aspect the present invention relates to a method for expanding thermally expandable thermoplastic microspheres. The method comprising providing a slurry of thermally expandable thermoplastic microspheres into a heating zone. The slurry is then heated in the heating zone to a temperature of at least 60° C. and a pressure of at least 4 bars is generated. The heating is achieved without any direct contact of the slurry with any fluid heat transfer medium. The pressure within the heating zone is maintained such that the thermally expandable thermoplastic microspheres do not fully expand. The slurry is withdrawn from the heating zone through an outlet pipe and then through a distribution pipe. The outlet pipe is attached to the distribution pipe between an inlet and an outlet of the distribution pipe. The slurry is withdrawn into a zone with a lower pressure to fully expand the thermally expandable thermoplastic microspheres.

DETAILED DESCRIPTION

For a complete understanding of the present invention and the advantages thereof, reference is made to the following detailed description and the accompanying figures.

It should be appreciated that the various aspects and embodiments of the detailed description and the accompanying figures as disclosed herein are illustrative of the specific ways to exercise the invention and do not limit the scope of invention when taken into consideration with the claims and the detailed description and the accompanying figures. It will also be appreciated that features from different aspects and embodiments of the invention may be combined with features from different aspects and embodiments of the invention.

The apparatus and method according to present invention can be used for all kinds of thermally expandable thermoplastic microspheres.

As used herein, thermally expandable thermoplastic microspheres refers to a thermoplastic polymer shell encapsulating a blowing agent. When expanded by heat the thermally expandable thermoplastic microspheres are referred to as expanded thermoplastic microspheres.

Figure 1:
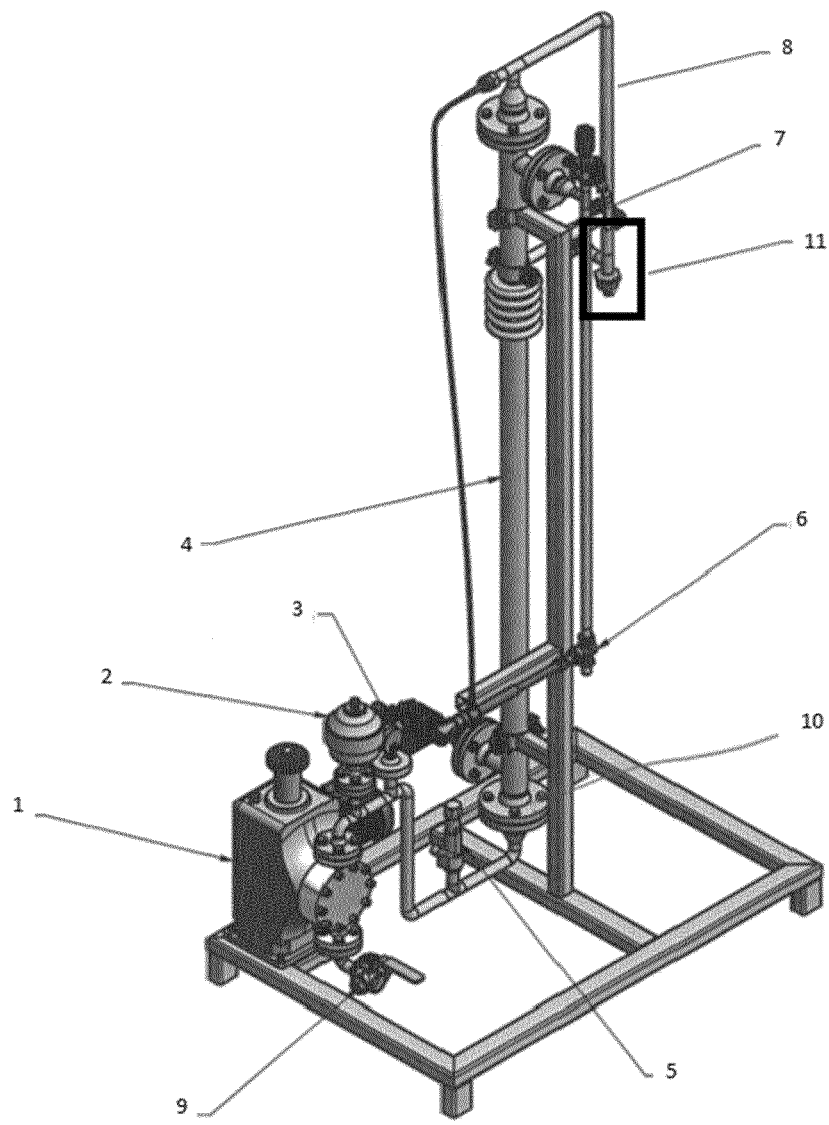
FIG. 1 shows an apparatus for expanding thermally expandable thermoplastic microspheres according to the present disclosure.

In a first aspect the present invention relates to an apparatus for expanding thermally expandable thermoplastic microspheres. The apparatus is shown in FIG. 1. The apparatus comprises a heating zone 4 which is capable of withstanding a pressure of at least 4 bars. The heating zone 4 has an inlet pipe 10 and an outlet pipe 8. The apparatus comprises a pump 1 for feeding a slurry of thermally expandable thermoplastic microspheres into the heating zone 4. The pump 1 is capable of generating a pressure of at least 4 bars in the heating zone 4. The apparatus comprises a means for heating the slurry of thermally expandable thermoplastic microspheres in the heating zone 4 to a temperature of at least 60° C. without direct contact of the slurry to any fluid heat transfer medium. The outlet pipe 8 of the apparatus is attached to a distribution pipe 12 between an inlet 13 and an outlet 14 of the distribution pipe 12.

The thermally expandable thermoplastic microspheres can be those marketed by AkzoNobel under the trademark Expancel™. Thermally expandable thermoplastic microspheres and their manufacture are disclosed in, for example, U.S. Pat. No. 3,615,972, U.S. Pat. No. 3,945,956, U.S. Pat. No. 4,287,308, U.S. Pat. No. 5,536,756, U.S. Pat. No. 6,235,800, U.S. Pat. No. 6,235,394, U.S. Pat. No. 6,509,384, U.S. Pat. No. 6,617,363, U.S. Pat. No. 6,984,347, US 2004/0176486, EP 486080, EP 566367, EP 1067151, EP 1230975, EP 1288272, EP 1598405, EP 1811007, EP 1964903, WO 2002/096635, WO 2004/072160, WO 2007/091960, WO 2007/091961, WO 2007/142593, JP 1987-286534 and JP 2005-272633, which are hereby incorporated herein by reference.

The thermoplastic polymer shell can be made from polymers or co-polymers by polymerising various ethylenically unsaturated monomers. The ethylenically unsaturated monomers can be nitrile containing monomers, such as acrylonitrile, methacrylonitrile, alpha-chloroacrylonitrile, alpha-ethoxyacrylonitrile, fumaronitrile and crotonitrile, acrylic esters, such as methylacrylate or ethyl acrylate, methacrylic esters, such as methyl methacrylate, isobornyl methacrylate and ethyl methacrylate, vinyl halides, such as vinyl chloride, vinylidene halides, such as vinylidene chloride, vinyl pyridine, vinyl esters, such as vinyl acetate, styrene, optionally substituted, such as styrene, halogenated styrenes and alpha-methyl styrene, dienes, such as butadiene, isoprene and chloroprene, and any mixtures thereof.

The ethylenically unsaturated monomers may also comprise crosslinking multifunctional monomers. The crosslinking multifunctional monomers include any one of divinyl benzene, ethylene glycol di(meth)acrylate, diethylene glycol di(meth)acrylate, triethylene glycol di(meth)acrylate, propylene glycol di(meth)acrylate, 1,4-butanediol di(meth)acrylate, 1,6-hexanediol di(meth)acrylate, glycerol di(meth)acrylate, 1,3-butanediol di(meth)acrylate, neopentyl glycol di(meth)acrylate, 1,10-decanediol di(meth)acrylate, pentaerythritol tri(meth)acrylate, pentaerythritol tetra(meth)acrylate, pentaerythritol hexa(meth)acrylate, dimethylol tricyclodecane di(meth)acrylate, triallylformal tri(meth)acrylate, allyl methacrylate, trimethylol propane tri(meth)acrylate, trimethylol propane triacrylate, tributanediol di(meth)acrylate, PEG #200 di(meth)acrylate, PEG #400 di(meth)acrylate, PEG #600 di(meth)acrylate, 3-acryloyloxyglycol monoacrylate, triacryl formal or triallyl isocyanate, triallyl isocyanurate or any mixtures thereof. The crosslinking multifunctional monomers make up from 0.1 to 1 wt %, most preferably from 0.2 to 0.5 wt % of the total amounts of ethylenically unsaturated monomers of the thermoplastic polymer shell.

It is preferable that the thermoplastic polymer shell constitutes from 60 to 95 wt % of the thermally expandable thermoplastic microsphere and more preferably from 75 to 85 wt %.

A softening temperature of the thermoplastic polymer shell corresponds to its glass transition temperature ($T_g$). $T_g$ is within the range of 50 to 250° C., and more preferably in the range of 70 to 200° C.

The blowing agent in the thermally expandable thermoplastic microspheres can be a liquid which has a boiling temperature (at room temperature and pressure) not higher than the $T_g$. The blowing agent can be at least one hydrocarbon or any mixtures thereof. The hydrocarbons can be selected from n-pentane, isopentane, neopentane, butane, isobutane, hexane, isohexane, neohexane, heptane, isoheptane, octane and isooctane. The hydrocarbons can also be petroleum ether, chlorinated or fluorinated hydrocarbons, such as methyl chloride, methylene chloride, dichloro ethane, dichloro ethylene, trichloro ethane, trichloro ethylene and trichlorofluoro methane. The blowing agent is preferably at least one of isobutane, isopentane, isohexane, cyclohexane, isooctane, isododecane, and any mixtures thereof. The blowing agent is more preferably isobutane and isopentane.

The blowing agent is present in an amount of from 5 to 40 wt % of the thermally expandable thermoplastic microspheres.

The boiling temperature (at room temperature and pressure) of the blowing agent is preferably between −20 to 200° C., more preferably between −20 to 150° C. and even more preferably between −20 to 100° C.

A temperature at which the thermally expandable thermoplastic microspheres begin expanding at atmospheric pressure is referred to as $T_{start}$. $T_{start}$ depends on the type and combination of the thermoplastic polymer shell and the blowing agent. The thermally expandable thermoplastic microspheres used in the present invention preferably have a $T_{start}$ from between 40 to 230° C. and more preferably between 60 to 180° C.

The apparatus comprises the heating zone 4 into which a slurry of thermally expandable thermoplastic microspheres flows through. The heating zone 4 can be in the form of a vessel, pipe or tube. The heating zone 4 is provided with the inlet pipe 10 and the outlet pipe 8.

The heating zone 4 heats the slurry of thermally expandable thermoplastic microspheres therein without any direct contact of the slurry with any fluid heat transfer medium i.e. steam, or heated gas.

The heating zone 4 may be a heat exchanger. The heating zone 4 when in the form of the heat exchanger then comprises at least one pipe or tube surrounded by a heat transfer medium not being in direct contact with the slurry of thermally expandable thermoplastic microspheres. The heat exchanger may, for example, comprise several preferably parallel pipes or tubes, for example from 2 to 10 or from 3 to 7 pipes or tubes, preferably connected to a common inlet and a common outlet. The pipes or tubes, may each have an inner diameter from 2 to 25 mm, or preferably from 4 to 15 mm or even more preferably from 6 to 12 mm. It is also possible to have only one pipe or tube. Using a single pipe or tube has the advantage of decreasing the risk for uneven flow distribution caused by partial clogging in one of several parallel pipes or tubes. Such a single pipe or tube is preferably surrounded by a heat transfer media, positioned in a vessel or tank containing the heat transfer media. The heat transfer media may be any suitable fluid medium such as hot water, steam or oil.

The heating zone 4 may be provided with at least one electric heating element. The at least one electric heating element may be positioned inside or outside the heating zone 4, or any combination thereof. The electric heating element may be provided in the centre of the heating zone 4, such that the slurry of thermally expandable thermoplastic microspheres flows in the gap around that electric heating element within the heating zone 4. It is preferable that the electric heating elements are provided both inside and outside the at least one pipe or tube.

The heating zone 4 may be provided with an electromagnetic radiation microwave source, such as microwaves.

The heating zone 4 is preferably made from a thermally conductive metal such as steel or copper. The thermally conductive metal is advantageous where heating of the slurry is provided by means of a fluid heat transfer medium or by electric heating elements.

If the heating is provided by the electromagnetic radiation source, the heating zone 4 is made of a material permeable for such radiation emanating from the electromagnetic radiation source, such as a polymeric material.

The heating zone 4 heats the slurry of thermally expandable thermoplastic microspheres to a temperature of at least 60° C. The temperature at the heating zone 4 is measured by a thermometer 7. However with the heating zone 4 of the present invention it is possible to expand the thermally expandable thermoplastic microspheres requiring higher temperatures than practically achievable by steam, for e.g. by using electric heating elements or hot oil as a heat transfer medium. The temperature to which the slurry of thermally expandable thermoplastic microspheres is heated in the heating zone 4 depends on the type of thermally expandable thermoplastic microspheres. The temperature is at least 60° C. and preferably within the range of 60 to 250° C., more preferably 80 to 230° C. and even more preferably 80 to 200° C.

According to the present invention, the slurry of thermally expandable thermoplastic microspheres is used. By using the slurry of thermally expandable thermoplastic microspheres dusting is avoided. By using the slurry of thermally expandable thermoplastic microspheres, blockage of the apparatus by dry expanded thermoplastic microspheres is avoided.

The slurry of thermally expandable thermoplastic microspheres is obtained by providing to the thermally expandable thermoplastic microspheres a carrier liquid. The carrier liquid is inert to the thermally expandable thermoplastic microspheres. The carrier liquid can withstand temperatures to which the slurry is heated. The carrier liquid can be water, or a water based liquid to form an aqueous slurry of thermally expandable thermoplastic microspheres. The carrier liquid can be an organic liquid, such as vegetable oil, mineral oil and glycerol or any mixtures thereof. Since the organic liquids are free of water and since no steam or water needs to be added to the slurry, it is possible to prepare a water-free slurry of thermally expandable thermoplastic microspheres, this is advantageous where the resulting expanded thermoplastic microspheres are needed in applications that need to be water-free.

Furthermore, as no other fluid media needs to be added to the slurry, it is possible to prepare a slurry of expanded microspheres having a high and controlled solids content of the expanded thermoplastic microspheres.

A content of thermally expandable thermoplastic microspheres in the slurry of thermally expandable thermoplastic microspheres is between 5 to 50 wt %, preferably between 5 to 30 wt % and more preferably between 10 to 20 wt %. When the content is within these ranges a pump-ability of the slurry and/or a transportation of the slurry of thermally expandable thermoplastic microspheres in the apparatus is optimal.

The slurry of thermally expandable thermoplastic microspheres is fed into the heating zone 4 through the inlet pipe 10 by a pump 1. The pump 1 provides sufficiently high pressure (at least 4 bars) in the heating zone 4 so that the thermally expandable thermoplastic microspheres do not fully expand in the heating zone 4 when heated. The thermally expandable thermoplastic microspheres may expand partially within the heating zone 4, e.g. to a volume of from 10 to 80% or from 20 to 70% of the volume after the completed expansion outside the heating zone 4, but may also be prevented from expanding at all within the heating zone 4 by manipulating the pressure provided by the pump 1. The pump 1 can be any one of a hydraulic diaphragm pump, a piston pump, a screw pumps (e.g. eccentric screw pumps), a gear pumps, a rotary lobe pump and a centrifugal pumps. Hydraulic diaphragm pumps are particularly preferred. The pump 1 provides a force required for transporting the slurry of thermally expandable thermoplastic microspheres through apparatus.

The pressure within the apparatus is measured by a pressure gauge 3.

The apparatus may further be provided with a conduit (not shown) for transporting the slurry of thermally expandable thermoplastic microspheres to the pump 1, for example from a tank (not shown) holding the slurry of thermally expandable thermoplastic microspheres. The conduit (not shown) would be connected to a three way valve 9, which directs the slurry of thermally expandable thermoplastic microspheres through the apparatus.

The pressure provided by the pump 1 and required in the heating zone 4 depends on the specific thermally expandable thermoplastic microspheres. Preferably the pressure is at least 10 bars. The upper pressure limit is determined by practical considerations and may, for example, be up to 40 bars or up to 50 bars.

As noted above, the thermally expandable thermoplastic microspheres do not fully expand in the heating zone 4 when heated. As the thermally expandable thermoplastic microspheres are transported to an outlet 14 of a distribution pipe 12 the thermally expandable thermoplastic microspheres finally and fully expand when the pressure drops at the outlet 14 since the thermally expandable thermoplastic microspheres reach an area of sufficiently low pressure (such as atmospheric pressure) to facilitate the final expansion.

Figure 2:
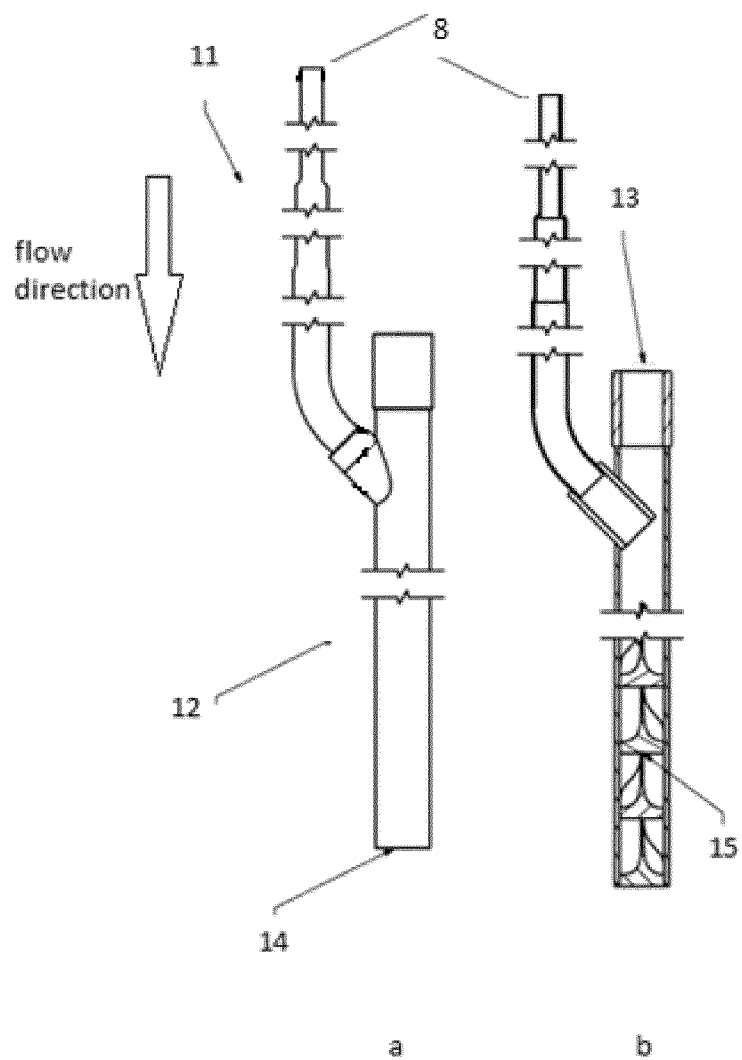
FIG. 2 shows an expanded view of an end section of an outlet pipe and a distribution pipe according to the present disclosure.

As shown in FIG. 2 the distribution pipe 12 is attached to the outlet pipe 8. The outlet pipe 8 is attached to the distribution pipe 12 between the inlet 13 and the outlet 14 of the distribution pipe 12. FIG. 2 (panel b) shows a cross-sectional view of FIG. 2 (panel a).

With the set up as shows in FIG. 2, as the expanded thermoplastic microspheres enter the distribution pipe 12, they bounce around in the inner walls of the distribution pipe 12 before leaving the distribution pipe 12 via the outlet 14. It has been found that this leads to less agglomeration of the expanded thermoplastic microspheres. It is thought that this is a result of the expanded thermoplastic microspheres hitting the inner walls of the distribution pipe 12 and by a type of vortex effect that is caused in the distribution pipe 12 by having the inlet 13, which facilitates air flow entering the distribution pipe 12. The air flow entering the distribution pipe 12 facilitates the cooling of the expanded thermoplastic microspheres as they enter the distribution pipe 12.

The outlet pipe 8 may have a constant internal diameter.

The outlet pipe 8 may increases in internal diameter such that an end section to an opening of the outlet pipe 8 has an internal diameter at least twice the internal diameter of the outlet pipe 8. The end section to the opening of the outlet pipe 8 may have an inner diameter up-to six times the internal diameter of the outlet pipe 8.

When the end section to an opening of the outlet pipe 8 has an internal diameter at least twice the internal diameter of the outlet pipe 8, this facilitates a more efficient expansion of the thermally expandable thermoplastic microspheres thermoplastic microspheres. When the end section to an opening of the outlet pipe 8 has an internal diameter at least twice the internal diameter of the outlet pipe 8 this creates a flow restriction of the manufactured expanded thermoplastic microspheres in the outlet pipe 8 to maintain pressure within the heating zone 4. It is observed that when the end section to an opening of the outlet pipe 8 has an internal diameter at least twice the internal diameter of the outlet pipe 8 this allows the thermally expandable thermoplastic microspheres to expand more freely in three dimensions leading to uniformly expanded thermoplastic microspheres of lower density and prevents agglomeration of the expanded thermoplastic microspheres, providing a more uniform (and less dense) density distribution of the expanded thermoplastic microspheres.

Furthermore it has been observed that having the end section to an opening of the outlet pipe 8 with an internal diameter at least twice the internal diameter of the outlet pipe 8, this prevents blockage of the opening of the outlet pipe 8 when the thermally expandable thermoplastic microspheres expand as they come to atmospheric pressure when leaving the outlet pipe 8 and into the distribution pipe 12.

As the expanded thermoplastic microspheres are good heat insulators a risk that the expanded thermoplastic microspheres and in particular the thermoplastic polymer shells stick to each other and form agglomerates is eliminated.

With the set up as shows in FIG. 2, as the expanded thermoplastic microspheres enter the distribution pipe 12, they traverse a direction of flow provided by a cooling media which can be applied via the inlet 13. In this embodiment the distribution pipe 12 allows instantaneous cooling of the expanded thermoplastic microspheres and immediately prevents further expansion and agglomeration of the expanded thermoplastic microspheres. The cooling media is passed from the inlet 13 of the distribution pipe 12 in a flow direction as shown in FIG. 2.

The cooling media can be air, water, nitrogen gas, or any other gasses or liquids, provided they are inert to the expanded thermoplastic microspheres. The cooling media can also be a flow of particles such as chalk particles, calcium carbonate particles, silica particles, clay particles and $TiO_2$ particles or any combination thereof. The addition of such particles through the inlet 13 of the distribution pipe 12 ensure a homogenous mixture of expanded thermoplastic microspheres and the particles exists as the expanded thermoplastic microspheres traverse a direction of flow provided by inlet 13. This is important when modified expanded thermoplastic microspheres are required in the end application.

The distribution pipe 12 may comprise at least one mixing/separating element 15 or combinations thereof. The at least one mixing/separating element(s) 15 are located within the mixing/separation device 12 downstream from the attachment of the outlet pipe 8 to the distribution pipe 12 as shown in FIG. 2b.

The at least one mixing/separating elements 15 can be selected from static mixers, rotating mixer, rotating knife or sieve or a stream dividing unit.

By having a combination of cooling media and mixing/separating elements 15 it is possible to instantly cool the expanded thermoplastic microspheres and simultaneously provide high energy mixing of the material. The mixing/separation device 12 provides efficient mixing of the cooling media with the expanded thermoplastic microspheres. The flow of the cooling media carries the expanded thermoplastic microspheres through the distribution pipe 12. Enough mechanical energy is thus provided for the distribution pipe 12 to separate the individual expanded thermoplastic microspheres from each other.

In order to further ensure a uniform output and heating of thermally expandable thermoplastic microspheres in the heating zone 4, a pulsation damper 2 may be present. The pulsation damper 2 stabilises a flow of the slurry of thermally expandable thermoplastic microspheres in the apparatus.

The outlet pipe 8 of heating zone 4 is preferably insulated to facilitate maximum expansion of the thermally expandable thermoplastic microspheres.

The outlet pipe 8 of heating zone 4 may be a rigid pipe or a flexible pipe. When in the form of the flexible pipe, this facilitates directing the expanded thermoplastic microspheres to their end use application without moving the entire apparatus.

The apparatus and method as disclosed herein are particularly useful for on-site expansion of the thermally expandable thermoplastic microspheres for water based applications e.g. emulsion explosives, paint, water based coatings, coatings for thermal printing paper and other, porous ceramics, gypsum board, modelling clay, crack fillers, and cementitious compositions. The apparatus and method as disclosed herein are particularly useful for on-site expansion of the thermally expandable thermoplastic microspheres for non-water based applications e.g. polyester putty, artificial wood formulations based on polyester, polyurethane or epoxy, cultured marble based on polyester, underbody coatings, elastomers, sealants, adhesives, phenolic resins, stucco, cable filling compound, and microcellular polyurethane foams. The expanded thermoplastic microspheres exiting the apparatus can be added directly into the production lines of such products. For example, the flow of expanded thermoplastic microspheres can be added, in-line, directly into the emulsion flow during the production of emulsion explosives or directly into the emulsion flow during the filling of a bore hole with emulsion explosives from a truck. In the latter case the explosives can be sensitized at the mining site and be transported unsensitized to the mine.

A control valve 6 within the apparatus can be used to direct flow within the apparatus and to maintain the pressure within the apparatus.

A safety valve 5 can be used in the apparatus prior to the heating zone 4 in order to shut off a flow of the slurry of thermally expandable thermoplastic microspheres to the heating zone 4 and/or to maintain a pressure within the heating zone 4.

The apparatus can be cleaned by replacing the slurry of thermally expandable thermoplastic microspheres with for e.g. water and running the apparatus by manipulating the positions of the safety valve 5, the control valve 6 and the three way valve 9.

The teachings of the present invention enable the expansion of thermally expandable thermoplastic microspheres directly in the apparatus such that the thermally expandable thermoplastic microspheres have a uniform density distribution and are well disperse (i.e. non-agglomerated).

The following non-limiting examples demonstrate the effects of the present invention.

Example 1—Expansion with Distribution Pipe

As a control experiment, a slurry of thermally expandable thermoplastic microspheres (Expancel 461WU40) were expanded on an apparatus by a method where an outlet pipe of constant diameter was used without a distribution pipe. The thermally expandable thermoplastic microspheres were expanded by using an apparatus with a single 15 m long copper pipe (heating zone) positioned in a tank filled with hot water maintained at a temperature of 100° C. The copper pipe had a constant inner diameter of 7.8 mm. An aqueous slurry of 20 wt % microspheres was pumped with a diaphragm pump at a rate of 80 liter/hr through the copper pipe. The diaphragm pump generated a pressure of 6 bars. The expanded thermoplastic microspheres exited the copper pipe through the outlet pipe.

As an experiment according to the present invention, thermally expandable thermoplastic microspheres (Expancel 461WU40) were expanded on an apparatus by a method as described above but where a distribution pipe was used attached to the outlet pipe.

With the experiment according to the present invention, it was found that the level of agglomeration was improved by a visual inspection of the expanded material. Furthermore it was found that the temperature of the expanded thermoplastic microspheres was much cooler (65° C.) in a storage bag after 10 mins of expansion compared to the control experiment (90° C.). This is indicative that no further expansion would occur and reduces the risk of agglomeration in bagging, compared to control experiment where a same volume of expanded thermoplastic microspheres was bagged in a same sized storage bag.

Example 2—Expansion with Distribution Pipe

A degree of agglomeration (dispersability) can be ranked on a 5 point scale, where 1 is highly agglomerated and 5 is completely free from agglomerates.

A degree of agglomeration was detected by using the following method. The expanded thermoplastic microspheres product is dispersed in Mowilith LDM 1871S binder of viscosity 0.95-1.50 Pas (as measured with a Brookfield sp. 3, 10 rpm) to provide a 5 wt % dispersion. The resulting dispersion is homogenized using a planet mixer (57.5 mm) at 100 rpm for 5 minutes. The homogenized dispersion of the expanded thermoplastic microspheres is applied to a plastic sheet to a 180 μm film thickness. The film is dried for 10 minutes. The number of agglomerates was analysed on a 10×10 cm area of the film.

As a control experiment, various slurries of Expancel 461WU40 were expanded on an apparatus by a method similar to Example 1 in a heating zone heated by oil at a temperature of 100.5° C. at flow rate of 120 kg slurry per hour. Four slurry concentrations were evaluated with a different dry content of thermally expandable thermoplastic microspheres. The expanded thermoplastic microspheres were produced into a 50 L plastic bag. An outlet pipe of constant diameter was used and no distribution pipe was attached to the outlet pipe.

The resulting agglomerates were analysed on a 10×10 cm area of film and results shown in Table 1.

TABLE 1

| Dry content % | Dry density (g/L) | Dispersability |
|---|---|---|
| 20 | 30.8 | 1 |
| 15 | 27.3 | 1 |
| 10 | 24.6 | 1 |
| 7.5 | 23.2 | 1 |

As an experiment according to the present invention, various slurries of Expancel 461WU40 were expanded on an apparatus by a method similar to the control experiment in a heating zone heated by oil at a temperature of 100.5° C. at flow rate of 120 kg slurry per hour. Four slurry concentrations were evaluated with a different dry content of thermally expandable thermoplastic microspheres. The expanded thermoplastic microspheres were produced into a 50 L plastic bag. The inlet of the distribution pipe was subjected to a cooling media of pressurised air (5.3 bar).

The resulting agglomerates were analysed on a 10×10 cm area of film and results shown in Table 2.

TABLE 2

| Dry content % | Dry density (g/L) | Dispersability |
|---|---|---|
| 20 | 48.5 | 3 |
| 15 | 43.1 | 3.5 |
| 10 | 38.0 | 4 |
| 7.5 | 37.0 | 5 |

As can be seen the dispersability is remarkably improved even when the density is higher. What is apparent from the example according to the present invention is that by having a lower dry-content—the dispersability is improved and the expansion is better (lower density). By cooling the expanding microspheres immediately at the exit from the outlet pipe by air, expansion is prevented. A higher density is achieved compared to when no cooling media is applied.

When combining the distribution pipe and device and cooling media of air expanded thermoplastic microspheres are produced with a much lower degree of agglomeration.

Example 3—Outlet Pipe with Increasing Diameter, with Distribution Pipe

An experiment was performed analogously to experiment 2, with slurry having a dry content of thermally expandable thermoplastic microspheres of 10%.

As a control experiment the outlet pipe had a constant inner diameter of 7.8 mm was used with a distribution pipe and a cooling media of pressurized air of 5.3 bar was applied via the inlet.

In a further experiment the outlet pipe was replaced with which widens with an inner diameter from 7.8 mm to 16.0. A distribution pipe and a cooling media of pressurized air of 5.3 bar was applied via the inlet.

The resulting agglomerates were analysed on a 10×10 cm area of film and results shown in Table 3.

TABLE 3

| Dry content % | Dry density (g/L) | Dispersability |
|---|---|---|
| 10 | 38.0 | 4 |
| 10 | 30.1 | 5 |

Table 3 shows in the top row; constant pipe diameter before cooling with air and in the bottom row; increasing pipe diameter before cooling with air.

The results clearly demonstrate with the wider outlet pipe thermoplastic microspheres are produced with a much lower density and with a lower degree of agglomeration.

The invention claimed is:

1. An apparatus for expanding thermally expandable thermoplastic microspheres, the apparatus comprising:
    a heating zone being capable of withstanding a pressure of at least 4 bars, the heating zone having an inlet pipe and an outlet pipe,
    a pump for feeding a slurry of thermally expandable thermoplastic microspheres into the heating zone and capable of generating a pressure of at least 4 bars in the heating zone;
    a means for heating the slurry of thermally expandable thermoplastic microspheres in the heating zone to a temperature of at least 60° C. without direct contact of the slurry to any fluid heat transfer medium; and
    a distribution pipe having an inlet and an outlet, wherein the outlet pipe is attached to the distribution pipe between the inlet and the outlet of the distribution pipe.

2. The apparatus according to claim 1, wherein the outlet pipe has a constant internal diameter.

3. The apparatus according to claim 1, wherein the outlet pipe increases in internal diameter such that an end section to an opening of the outlet pipe increases in an internal diameter to at least twice the internal diameter of the outlet pipe.

4. The apparatus according to claim 1, wherein the distribution pipe comprises at least one mixing/separating element within, or combinations thereof downstream from the attachment of the outlet pipe to the distribution pipe.

5. The apparatus according to claim 4, wherein the at least one mixing/separating element is selected from a rotating mixer, a static mixer, a rotating knife, a steam dividing unit or a sieve.

6. The apparatus according to claim 1, wherein the means for heating the slurry is at least one electric heating element, a heat exchanger or an electromagnetic radiation source.

7. The apparatus according to claim 1 further comprising a pulsation damper positioned between the pump and the heating zone.

8. A method for expanding thermally expandable thermoplastic microspheres comprising the steps:
 providing a slurry of thermally expandable thermoplastic microspheres into a heating zone,
 heating the slurry of thermally expandable thermoplastic microspheres in the heating zone to a temperature of at least 60° C. and generating a pressure of at least 4 bars, wherein the heating is achieved without any direct contact of the slurry with any fluid heat transfer medium,
 maintaining the pressure within the heating zone such that the thermally expandable thermoplastic microspheres do not fully expand; and
 withdrawing the slurry from the heating zone through an outlet pipe and then through a distribution pipe, wherein the outlet pipe is attached to the distribution pipe between an inlet and an outlet of the distribution pipe, and into a zone with a lower pressure to fully expand the thermally expandable thermoplastic microspheres.

9. The method according to claim 8, wherein the outlet pipe is used with a constant internal diameter.

10. The method according to claim 8, wherein the outlet pipe is used which increases in internal diameter such that an end section to an opening of the outlet pipe increases in an internal diameter to at least twice the internal diameter of the outlet pipe.

11. The method according to claim 8, wherein the distribution pipe comprises at least one mixing/separating element within, or combinations thereof downstream from the attachment of the of the outlet pipe with the distribution pipe.

12. The method according to claim 8 further comprising adding a cooling media via the inlet, wherein the cooling media is any one of a gas, a liquid or particulates or any combination thereof, selected from air, water, nitrogen gas, chalk particles, calcium carbonate particles, silica particles, clay particles and $TiO_2$ particles.

13. The method according to claim 8, wherein the pressure in the heating zone is maintained from between 4 to 50 bars.

14. The method according claim 8, wherein the slurry of expandable microspheres is heated in the heating zone to a temperature from at least 60 to 250° C.

15. The method according to claim 8, wherein a content of thermally expandable thermoplastic microspheres in the slurry of thermally expandable thermoplastic microspheres is between 5 to 50 wt %.

16. The method according to claim 8, wherein a carrier liquid in the slurry of thermally expandable thermoplastic microspheres is a water based liquid or an oil based liquid.

17. The method according to claim 8, wherein heating the slurry of thermally expandable thermoplastic microspheres is carried out by at least one of an electric heating element, a heat exchanger or an electromagnetic radiation source.

\* \* \* \* \*